United States Patent
Strasser et al.

(10) Patent No.: US 7,676,157 B2
(45) Date of Patent: *Mar. 9, 2010

(54) METHOD AND APPARATUS FOR PROVIDING GAIN EQUALIZATION TO AN OPTICAL SIGNAL IN AN OPTICAL COMMUNICATION SYSTEM

(75) Inventors: Thomas Andrew Strasser, Warren, NJ (US); Per Bang Hansen, Rumson, NJ (US); Neil Allan Jackman, Freehold, NJ (US); Andrew John Stentz, Clinton, NJ (US); Jefferson L. Wagener, New Hope, PA (US)

(73) Assignee: Meriton Networks US Inc., Wilmington, DE (US)

( * ) Notice: Subject to any disclaimer, the term of this patent is extended or adjusted under 35 U.S.C. 154(b) by 2400 days.

This patent is subject to a terminal disclaimer.

(21) Appl. No.: 10/099,891

(22) Filed: Mar. 15, 2002

(65) Prior Publication Data

US 2002/0159679 A1   Oct. 31, 2002

Related U.S. Application Data

(60) Provisional application No. 60/276,310, filed on Mar. 16, 2001.

(51) Int. Cl.
   *H04J 14/02* (2006.01)
(52) U.S. Cl. ........................................ 398/85
(58) Field of Classification Search ............ 398/94, 398/79, 82, 93
See application file for complete search history.

(56) References Cited

U.S. PATENT DOCUMENTS

| | | | |
|---|---|---|---|
| 5,583,683 A | 12/1996 | Scobey | 359/127 |
| 5,881,199 A | 3/1999 | Li | 385/140 |
| 6,021,237 A | 2/2000 | Kim et al. | 385/28 |
| 6,028,689 A | 2/2000 | Michalicek et al. | 359/224 |
| 6,094,296 A * | 7/2000 | Kosaka | 359/341.41 |
| 6,151,157 A | 11/2000 | Ball et al. | 359/341 |
| 6,212,315 B1 | 4/2001 | Doerr | 385/31 |

(Continued)

OTHER PUBLICATIONS

K. Chu et al., "Scalable Optical-Path Supervisory Scheme Using Pilot Tones and Channel Equalizers", Electronics Letter, vol. 36, No. 9, Apr. 27, 2000.*

(Continued)

*Primary Examiner*—Shi K Li
(74) *Attorney, Agent, or Firm*—Mayer & Williams PC; Stuart H. Mayer; Karin L. Williams

(57) ABSTRACT

An optical switch includes at least one input port for receiving a plurality of channel wavelengths of an optical signal and a plurality of output ports. A plurality of wavelength selective elements are also provided, which each select a channel wavelength from among the plurality of channel wavelengths received at the input port. A plurality of optical elements are respectively associated with the plurality of wavelength selective elements. Each of the optical elements direct one of the selected channel wavelengths, which are selected by the associated wavelength selective element, to any one of the output ports independently of all other channel wavelengths and with a selectively variable degree of attenuation. The switch also includes a controller for adjusting a configuration of the optical elements to provide the channel wavelengths with the selectively variable degree of attenuation.

44 Claims, 7 Drawing Sheets

U.S. PATENT DOCUMENTS

| | | |
|---|---|---|
| 6,256,430 B1 * | 7/2001 | Jin et al. .................. 385/18 |
| 6,263,123 B1 | 7/2001 | Bishop et al. ............. 385/15 |
| 6,501,877 B1 * | 12/2002 | Weverka et al. .......... 385/31 |
| 6,614,953 B2 * | 9/2003 | Strasser et al. ........... 385/17 |
| 6,631,222 B1 * | 10/2003 | Wagener et al. .......... 385/16 |
| 6,721,509 B2 * | 4/2004 | Xiao et al. ................. 398/83 |
| 7,469,080 B2 * | 12/2008 | Strasser et al. ........... 385/17 |

OTHER PUBLICATIONS

U.S. Appl. No. 09/571,833, filed May 16, 2000, Wagener et al.
U.S. Appl. No. 09/691,812, filed Oct. 19, 2000, Wagener et al.

* cited by examiner

BIDIRECTIONAL INPUTS/OUTPUTS WITH INDEPENDENT WAVELENGTH DISTRIBUTION

BIDIRECTIONAL INPUTS/OUTPUTS WITH INDEPENDENT WAVELENGTH DISTRIBUTION

OPTICAL TAP CONFIGURATION TO MONITOR ANY INPUT AND OUTPUT PORTS ON A PER WAVELENGTH BASIS TO VERIFY SWITCH LOSS AS WELL AS SIGNAL PRESENCE AND POWER

OPTICAL TAP CONFIGURATION TO MONITOR ANY INPUT AND OUTPUT PORTS ON A PER WAVELENGTH BASIS WHERE OUTPUT PORT IS AFTER AN OPTICAL AMPLIFIER, ENABLING GAIN FLATTENING OF AMPLIFIER

METHOD AND APPARATUS FOR PROVIDING GAIN EQUALIZATION TO AN OPTICAL SIGNAL IN AN OPTICAL COMMUNICATION SYSTEM

STATEMENT OF RELATED APPLICATION

This application claims the benefit of priority to U.S. Provisional Patent Application No. 60/276,310, filed Mar. 16, 2001 and entitled "Reconfigurable Optical System."

FIELD OF THE INVENTION

The present invention relates generally to optical communication systems, and more particularly to a WDM optical communication system that employs rare-earth doped fiber amplifiers and gain equalization across the WDM signal bandwidth.

BACKGROUND OF THE INVENTION

Conventional optical transmission systems use optical fibers to carry large amounts of data over long distances from a transmit terminal to a receive terminal. Wavelength division multiplexing (WDM) has been explored as an approach for increasing the capacity of existing fiber optic networks. In a WDM system, plural optical signal channels are carried over a single optical fiber with each channel being assigned a particular wavelength. The maximum distance that the optical signals can be transmitted in the fiber without amplification or regeneration is limited by the loss and dispersion associated with the optical fiber. To transmit optical signals over long distances, the transmission systems may include a number of optical amplifiers periodically located along the fiber route from the transmit terminal to the receive terminal. Each amplifier boosts the weak received signal to compensate for the transmission losses, which occurred from the last amplifier. For example, optical channels in a WDM system are frequently transmitted over optical fibers that have relatively low loss at wavelengths within a range of about 1525 nm to 1580 nm. WDM optical signal channels at wavelengths within this low loss "window" can be transmitted over distances of approximately 50 km without significant attenuation. For distances beyond 50 km, however, optical amplifiers are required to compensate for optical fiber loss.

Optical amplifiers have been developed which include an optical fiber doped with a rare-earth element such as erbium. The erbium-doped fiber is "pumped" with light at a selected wavelength of either 1485 nm or 980 nm, which coincide with the absorption peaks of erbium. At the same time, a communication signal is passed through the doped fiber to provide amplification or gain at wavelengths within the low loss window of the optical fiber. However, erbium doped fiber amplifiers do not uniformly amplify light within the spectral region of 1525 to 1580 nm. For example, an optical channel at a wavelength of 1540 nm could be amplified 4 dB more than an optical channel at a wavelength of 1555 nm. While such a large variation in gain can be tolerated for a system with only one optical amplifier, it cannot be tolerated for a system with plural optical amplifiers or numerous, narrowly-spaced optical channels, particularly when the gain is sufficiently large to cause nonlinear propagation, which adversely affects transmission of the signal. In these environments, much of the pump power supplies energy for amplifying light at the high gain wavelengths rather than amplifying the low gain wavelengths. As a result, low gain wavelengths suffer excessive noise accumulation after propagating through several amplifiers.

Optical amplifiers with nominally wavelength-independent gain over a wide wavelength range are conventionally designed with a static filter having a wavelength-dependent loss that complements the amplifier wavelength-dependent gain. Wavelength dependent couplers, thin-film dielectric filters and fiber gratings are examples of three static filter technologies used in this application. These static equalizers can only provide a fixed amount of attenuation per channel and thus cannot correct for changes in the amplifier gain shape that results from a change in pump power or amplifier input power. This problem is conventionally corrected by inserting a Variable Optical Attenuator (VOA) to dynamically adjust the signal power in the amplifier. The VOA corrects for any discrepancy between amplifier gain and span loss, which ideally should be equal. This is necessary in practice because variation in fiber attenuation or span length alter the power level of the signals at the input to the amplifier.

Another phenomenon relating to the spectral gain profile of optical amplifiers is known as gain tilt, which is a particular problem for dynamically changing and/or reconfigurable dense wavelength division multiplexed communication links. Gain tilt arises when there are dynamic changes in operating conditions such as the input power and wavelengths of the transmitted channels. For example, when a channel is added or subtracted, thus changing the input power and spectrum of the optical signal, a gain fluctuation occurs in dependence on the channels' wavelength to effectively "tilt" the gain of the amplifier. An optical amplifier with Automatic Gain Control (AGC) programmed to maintain constant gain can be used to correct the aforementioned dynamic instability by decreasing or increasing the amplifier pump power when dropping or adding channels, respectively. However, improved amplifier performance is possible if AGC is implemented in a Variable Gain Amplifier (VGA) such that the amplifier gain can be adjusted to exactly offset the loss of the preceding span, without adding VOA loss to the low gain wavelengths. Such a VGA requires a filter that can dynamically adjust the wavelength-dependent loss to correct for gain tilt that arises from the change in pump power used to adjust the amplifier gain. Such a filter is typically described as a Dynamic Gain Equalizer (DGE), and it can also improve system performance by equalizing channel powers to correct for wavelength-dependent loss (WDL), polarization dependent loss (PDL), or even a laser transmitter that has an incorrect launch power. The net effect of adding a DGE is to achieve a system with better amplifier performance and greater uniformity of signal powers, which can enable more reliable transmission at higher data rates and/or over longer distances.

Dynamic gain equalizers can be used in optical transmission systems for purposes other than to compensate for non-uniformities in the gain of optical amplifiers. For example, the gain of an optical transmission system as actually deployed may not precisely match its design specifications. In such a case gain equalizers that provide a fixed gain profile and which are configured for the system's design specifications, as opposed to its actual specifications, will not necessarily result in gain equalization.

For the above reasons it is clear that there are significant advantages to employing a dynamic gain equalizer that compensates for dynamic fluctuations in the gain of an optically amplified system. While a number of technologies have been proposed to form a DGE as discrete elements, including heated waveguide arrays [U.S. Pat. No. 6,212,315], acoustooptic gratings [U.S. Pat. No. 6,021,237] and tunable fiber gratings [U.S. Pat. No. 6,151,157], none of the existing technologies have been extensively used to date in a deployed system because they suffer from a variety of shortcomings.

These shortcomings include one or more of the following: high cost, high insertion loss, and excessively large physical size—sometimes a size that is larger than the amplifier itself.

Accordingly, it would be desirable to provide a dynamic gain equalizer for use in an optical transmission system that overcomes the aforementioned deficiencies.

SUMMARY OF THE INVENTION

The present invention provides an optical switch that includes at least one input port for receiving a plurality of channel wavelengths of an optical signal and a plurality of output ports. A plurality of wavelength selective elements is also provided, which each select a channel wavelength from among the plurality of channel wavelengths received at the input port. A plurality of optical elements are respectively associated with the plurality of wavelength selective elements. Each of the optical elements direct one of the selected channel wavelengths, which are selected by the associated wavelength selective element, to any one of the output ports independently of all other channel wavelengths and with a selectively variable degree of attenuation. The switch also includes a controller for adjusting a configuration of the optical elements to provide the channel wavelengths with the selectively variable degree of attenuation.

In accordance with one aspect of the invention, a monitoring arrangement is provided for determining a power level of a given channel wavelength received in the input port relative to a power level of the given channel wavelength received in one of the output ports.

In accordance with another aspect of the invention, the monitoring arrangement includes at least one monitoring port receiving a portion of optical power at each of the channel wavelengths from the input port. The monitoring arrangement also includes at least one detector associated with at least one of the wavelength selective elements for measuring a power level of an optical signal incident thereon. The detector is positioned to receive from the monitoring port the portion of optical power at the channel wavelength selected by the associated wavelength selective element.

In accordance with yet another aspect of the invention, an optical amplifier system is provided for amplifying with a prescribed gain at least one channel wavelength of a WDM optical signal. The optical amplifier arrangement includes an optical amplifier having an input port and an output port and a dynamic gain adjuster. The dynamic gain adjuster including at least one input port for receiving the WDM optical signal and at least one output port. The output port of the dynamic gain adjuster is being optically coupled to the input port of the optical amplifier. Also provided are a plurality of wavelength selective elements that each select a channel wavelength from among the channel wavelengths received at the input port of the dynamic gain adjuster. A plurality of optical elements are respectively associated with the plurality of wavelength selective elements. Each of the optical elements direct one of the selected channel wavelengths selected by the associated wavelength selective element to the output port of the dynamic gain adjuster with a selectively variable degree of attenuation and independently of all other channel wavelengths. A controller is provided for adjusting a configuration of at least one of the optical elements to provide the channel wavelength directed by the optical element with the selectively variable degree of attenuation to achieve the prescribed gain at the output port of the optical amplifier.

In accordance with another aspect of the invention, a method is provided for directing at least first and second wavelength components of a WDM signal that includes a plurality of wavelength components from an input port to selected ones of a plurality of output ports. The method begins by demultiplexing the first wavelength component from the WDM signal and directing the first wavelength component to a given output port while selectively attenuating the first wavelength component. Likewise, the second wavelength component is demultiplexed from the WDM signal and directed to one of the output ports selected independently from the given output port to which the first wavelength component is directed

DETAILED DESCRIPTION

The present invention provides a method and apparatus for dynamically performing gain equalization. The present inventors have recognized that dynamic gain equalization can be achieved within an optical switch that integrates Optical Add/Drop Multiplexer (OADM) routing with analog control over insertion losses instead of just the purely digital switching functionality offered by most conventional optical switches. By integrating into a single device the functionality of the DGE with the functionality of an optical switch, the relatively stringent requirements that would otherwise be imposed on cost, size, and loss can be reduced. Moreover, an OADM is an excellent candidate for such integration, because, similar to a DGE, it is typically situated between two amplifier stages to minimize the impact of insertion loss. Additionally, because the function of the OADM is to separate channels for routing to the thru, drop, or add paths, it is possible to adjust the insertion loss in the section of the OADM in which the wavelengths are separated for routing purposes. Therefore, by integrating a DGE within an OADM it is possible to reduce size, cost and insertion loss over an approach that uses discrete elements to perform the different functions.

Figure 1:
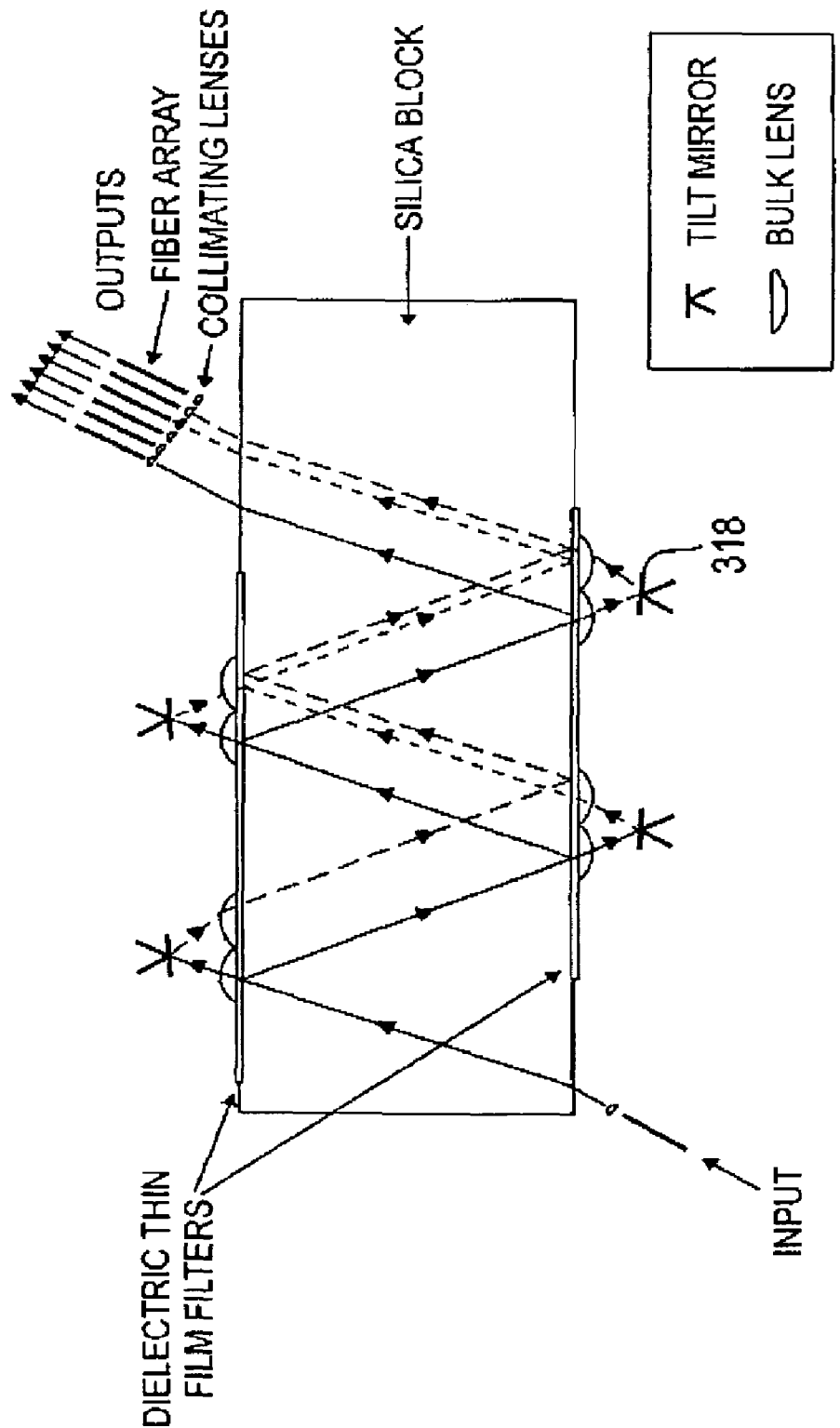
FIGS. 1 and 2 show illustrative examples of optical switches that may be employed in the present invention for providing analog control of insertion losses on a per wavelength basis.
Figure 2:
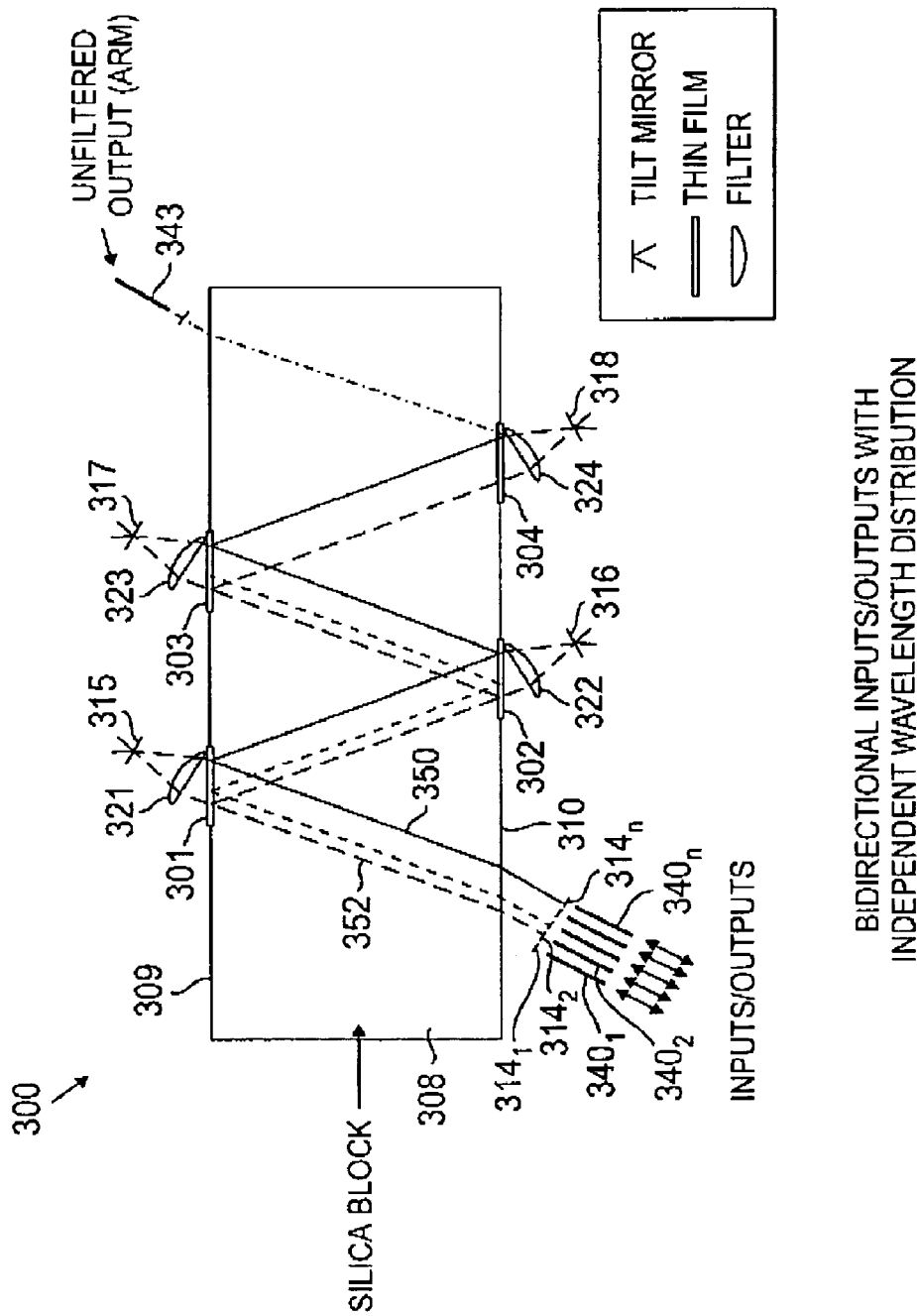

FIGS. 1 and 2 show illustrative examples of an optical switch that provides analog control of insertion losses on a per wavelength basis. While both switches also have the ability to route any wavelength component from any input port to any output port, the switch shown in FIG. 2 is particularly advantageous because in this switch each and every wavelength component can be directed from any given port to any other port without constraint. More specifically, unlike most optical switches, this switch is not limited to providing connections between a subset of input ports and a subset of output ports, or vice versa. Rather, this switch can also provide a connection between two ports within the same subset (either input or output). These optical switches are disclosed in copending U.S. patent application Ser. Nos. 09/571,833 and 09/691,812, which are both hereby incorporated by reference in their entirety. While the present invention may employ any optical switch that provides analog control of insertion losses on a per wavelength basis, the optical switch disclosed in the aforementioned U.S. patent application Ser. No. 09/691,812 will serve as an exemplary optical switch, and accordingly, additional details concerning this switch will be presented below.

In FIG. 2, the optical switching element 300 comprises an optically transparent substrate 308, a plurality of dielectric thin film filters 301, 302, 303, and 304, a plurality of collimating lens 321, 322, 323, and 324, a plurality of tiltable mirrors 315, 316, 317, and 318 and a plurality of communication ports $340_1$, $340_2$, ... $340_n$. Substrate 308 has parallel planar surfaces 309 and 310 on which first and second filter arrays are respectively arranged. The first filter array is composed of thin film filters 301 and 303 and the second filter array is composed of thin film filters 302 and 304. Individual ones of the collimating lenses 321-324 and tiltable mirrors 315-318 are associated with each of the thin film filters. Each thin film filter, along with its associated collimating lens and tiltable mirror, effectively forms a narrow band, free space switch, i.e. a switch that routes individual wavelength components along different paths. The overall physical dimensions of switching element 300 will be determined in part by the beam diameter of the WDM signal.

Thin film filters 301-304 are well-known components (for example, see U.S. Pat. No. 5,583,683), which have a dielectric multilayer configuration. The thin film filters 301-304 have a wavelength dependent characteristic, that is, their reflectivity and transmissivity depends on the wavelength of light. In particular, among the wavelength components of the WDM optical signal received by thin film filter 301, only the component with wavelength $\lambda_1$ is transmitted therethrough. The remaining wavelength components are all reflected by thin film filter 301. Likewise, thin film filter 302 transmits only the component with wavelength $\lambda_2$ and reflects all other wavelengths. In the same manner, the thin film filters 303 and 304 transmit components with wavelengths $\lambda_3$ and $\lambda_4$, respectively, and reflect all other wavelengths. Thus, the present invention demultiplexes wavelengths through a plurality of thin film filters with different pass bands.

The tiltable mirrors 315-318 are any mirrors that can be precisely tilted on 2 axes, and which preferably are very small and reliable with a flatness better than about $\lambda/20$. The exemplary mirrors discussed herein are supported by one or more flexure arms that employ a micro-electromechanical system (MEMS). Actuation of the flexure arms tilts the mirror surface to alter the direction of propagation of an incident beam of light. Examples of such micro-electromechanical mirrors are disclosed in U.S. Pat. No. 6,028,689 and the references cited therein. Of course, other mechanisms may be alternatively employed to control the position of the mirrors, such as piezoelectric actuators, for example.

In operation, a WDM optical signal composed of different wavelengths $\lambda_1$, $\lambda_2$, $\lambda_3$ and $\lambda_4$ is directed from one of the communication ports $340_1$, $340_2$, ... $340_n$ to the collimator lens $314_1$, $314_2$, ... $314_n$ associated with that communication port. The WDM signal traverses substrate 308 and is received by thin film filter 301. According to the characteristics of the thin film filter 301, the optical component with wavelength $\lambda_1$ is transmitted through the thin film filter 301, while the other wavelength components are reflected and directed to thin film filter 302 via substrate 308. The wavelength component $\lambda_1$ which is transmitted through the thin film filter 301, is converged by the collimating lens 321 onto the tiltable, reflective mirror 315. Tiltable mirror 315 is positioned so that wavelength component $\lambda_1$, which is received by the collimating lens 321 along path 350, is retroreflected from the mirror 315 to a selected one of the communication ports $340_1$-$340_n$ via path 352. Optical path 352 is offset from optical path 350 so that wavelength component $\lambda_1$ is directed to the desired communication port. The particular communication port that is selected to receive the wavelength component will determine the particular orientation of the mirror 315. If optical paths 350 and 352 are coincident, wavelength component $\lambda_1$ will be directed back to the communication port from which it originated.

As mentioned, the remaining wavelength components $\lambda_2$, $\lambda_3$, and $\lambda_4$ are reflected by thin film filter 301 back into substrate 308 and directed to thin film filter 302. Wavelength component $\lambda_2$ is transmitted through thin film filter 302 and lens 322 and retroreflected to a selected communication port by tiltable mirror 316 via thin film filter 301, which reflects wavelength component $\lambda_2$. Similarly, all other wavelength components are separated in sequence by the thin film filters 303-304 and subsequently reflected by tiltable mirrors 317-318 to selected communication ports. By appropriate actuation of the tiltable mirrors, each wavelength component can be directed to a communication port that is selected independently of all other wavelength components. Any wavelengths that have not been redirected by any of the tiltable mirrors may be received by an optional bypass communication port or fiber 343. Although the optical switch of FIG. 2 is configured to selectively switch four wavelengths, it will be recognized that the invention more generally may selectively switch any number of wavelengths by employing a corresponding number of narrow band, free space switches.

Each individual tiltable mirror has an electronics circuit to which a voltage is applied to steer the mirror. The voltage necessary to steer the mirror so that the wavelength it reflects is directed to a particular output fiber will differ from mirror to mirror. The operating voltages (typically over a −60 to +60 volt range) for steering the mirror are chosen to maximize the optical power coupled into the desired output fiber.

One of ordinary skill in the art will recognize that each of the narrow band free space switches shown in FIG. 2 do not necessarily require a single lens and mirror combination to perform retroreflection. Rather, other combinations of optical elements may be used to properly redirect the wavelength components. For example, two tiltable mirrors may be arranged to achieve the same result without the use of a lens. Alternatively, a single mirror may be used if in addition to being tiltable along two axes its position can also undergo a spatial translation. This invention may employ any free space switch configuration that can retroreflect the beam with sufficient translation to access the desired fiber ports.

The illustrative optical switch depicted in FIG. 1 is similar to that shown in FIG. 2 except that in FIG. 1 there are distinct sets of communication ports; once light enters one subset, it must exit from the other subset. Moreover, in FIG. 1, the tiltable mirrors are not retroreflective mirrors. Additional details concerning this optical switch may be found in the aforementioned patent application.

As previously mentioned, the optical switches shown in FIGS. 1 and 2 provide analog control of insertion losses for each wavelength component transmitted between any two communication ports. Such control is achieved by adjusting the orientation of the tiltable mirrors located in the optical path connecting the two communication ports. As detailed below, this capability may be employed to provide a dynamic gain equalizer that can individually adjust the power level of each and every wavelength component that traverses the equalizer.

Figure 3:
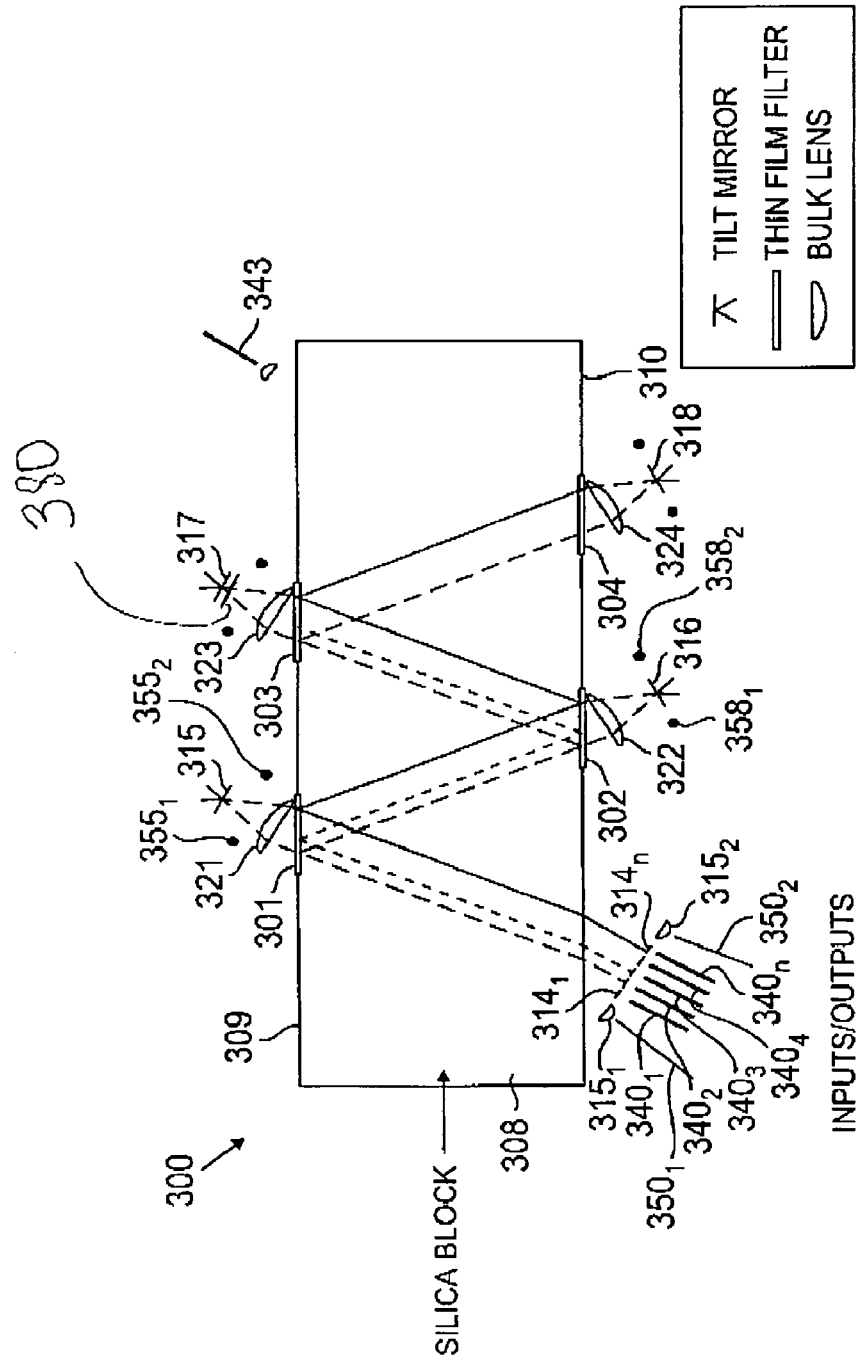
FIG. 3 shows an embodiment of a dynamic gain equalizer constructed in accordance with the present invention.

FIG. 3 shows an embodiment of a dynamic gain equalizer 300 constructed in accordance with the present invention, which employs the optical switch shown in FIG. 2. In FIGS. 2 and 3 like elements are denoted by like reference numerals. In addition to communication ports $340_1$-$340_n$, the gain equalizer 300 also includes at least one monitoring port that is parallel to the communication ports $340_1$-$340_n$. Two such monitoring ports $350_1$ and $350_2$ are depicted in FIG. 3. Similar to the communication ports $340_1$-$340_n$, monitoring ports $350_1$ and $350_2$ have collimating lenses $315_1$ and $315_2$ respectively associated with them. Each of the monitoring port $350_1$ and $350_2$ is situated so that a wavelength component directed from that port is received by the narrow band, free space switch that is used to route that given wavelength component in the previously described manner. However the monitoring ports $350_1$ and $350_2$ are situated so that each wavelength component passes through the thin film filter, but not the collimating lens, of the appropriate narrow band, free space switch. For example, if wavelength component $\lambda_2$ is directed from monitoring port $350_1$, it will traverse thin film filter 302 but not collimating lens 322. Rather, as described below, wavelength component $\lambda_2$ will be received by a detector associated with the monitoring port $350_1$.

In accordance with the present invention, a dynamic gain equalizer is provided in which each of the narrow band, free space switches include a detector associated with each of the monitoring ports that are provided. For example, in FIG. 3, which employs two monitoring ports $350_1$ and $350_2$, the free space switch routing wavelength $\lambda_2$ includes detectors $355_1$ and $355_2$. Detectors $355_1$ and $355_2$ receive optical signals from monitoring ports $350_1$ and $350_2$, respectively. Likewise, the free space switch routing wavelength $\lambda_2$ includes detectors $358_1$ and $358_2$ that also receive signals from monitoring ports $350_1$ and $350_2$. Likewise, a similar pair of detectors is provided for the remaining free space switches depicted in FIG. 3. The detectors that are employed measure the power level of the received wavelength components and may be, for example, conventional broadband photodetectors.

Returning to the example in which wavelength $\lambda 2$ is directed from monitoring port $350_1$, it will be seen that wavelength component $\lambda_2$ will be received by detector $358_1$ rather than passing through collimating lens 322. Similarly, if wavelength component $\lambda_1$ is directed from monitoring port $350_1$, it will traverse thin film filter 301 so that it is received by detector $355_1$.

The general operation of dynamic gain equalizer 300 is as follows. First, a small portion of the optical signal in any of the communication ports $340_1$-$340_n$ is coupled by an optical tap to one of the monitoring ports $350_1$ and $350_2$. The wavelength component or components of the tapped signal are then directed from the monitoring port to one of the detectors associated with the appropriate free space switch or switches receiving those components. In this way the relative power level of the signal in the communication port being tapped can be determined. Of course, by performing a proper calibration, the absolute power level of the signal also can be determined.

Figure 4:
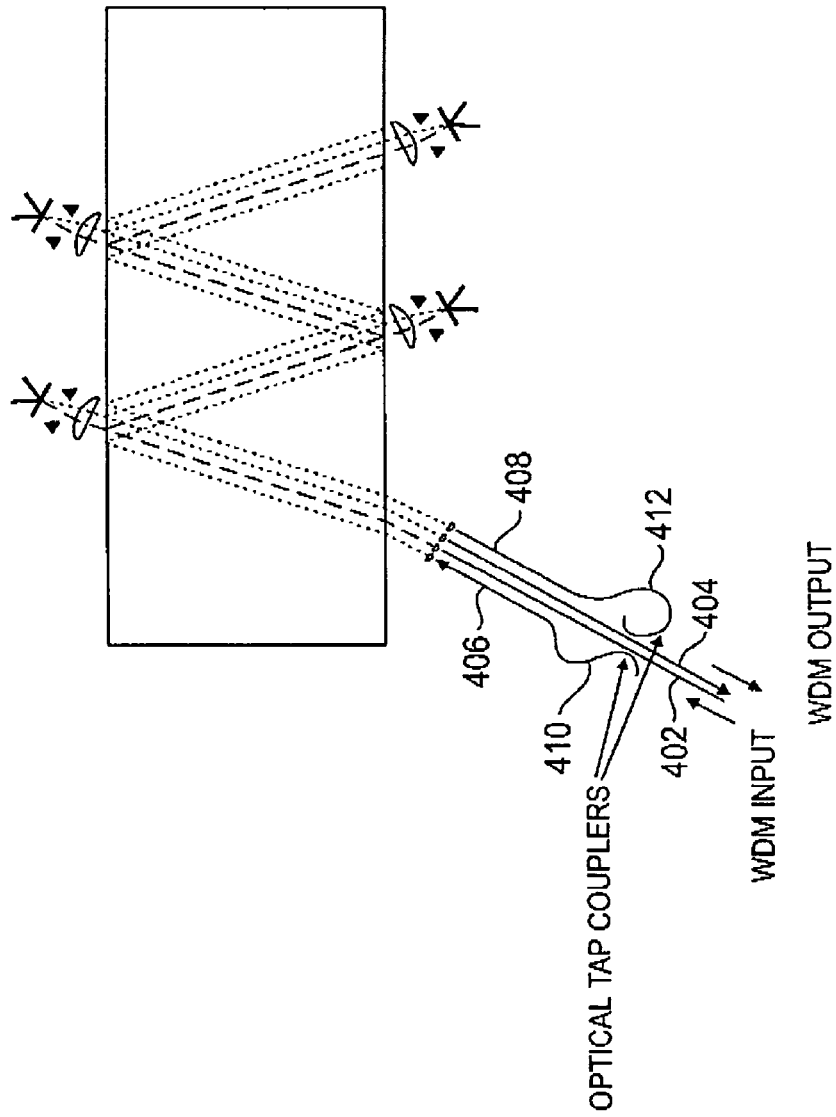
FIG. 4 shows an embodiment of a dynamic gain equalizer similar to that depicted in FIG. 3, which illustrates the manner in which the attenuation of one or more wavelength components is measured.

FIG. 4 further illustrates how this monitoring technique can be used to determine the real-time attenuation between any two ports of the gain equalizer. For simplicity, FIG. 4 shows only two communication ports 402 and 404 and two monitoring ports 406 and 408. Communication port 402 serves as an input port and communication port 404 serves as an output port. A coupler 410 taps a portion of the signal in the input port 402 to monitoring port 406 and a coupler 412 taps a portion of the signal in output port 404 to monitoring port 408. By detecting the absolute power levels directed from each of the monitoring ports in the manner previously described, the real-time attenuation between the two ports can be determined and continuously monitored.

It should be noted that the inventive dynamic gain equalizer is not limited to any particular number of communication ports and monitoring ports. Moreover, the relative number of monitoring ports to the number of communication ports is also not fixed. For instance, if the number of monitoring ports equals the number of communication ports, then all the communication ports may be monitored simultaneously. If fewer monitoring ports are employed, the number of communication ports that can be monitored will be limited by the available number of monitoring ports.

Figure 5:
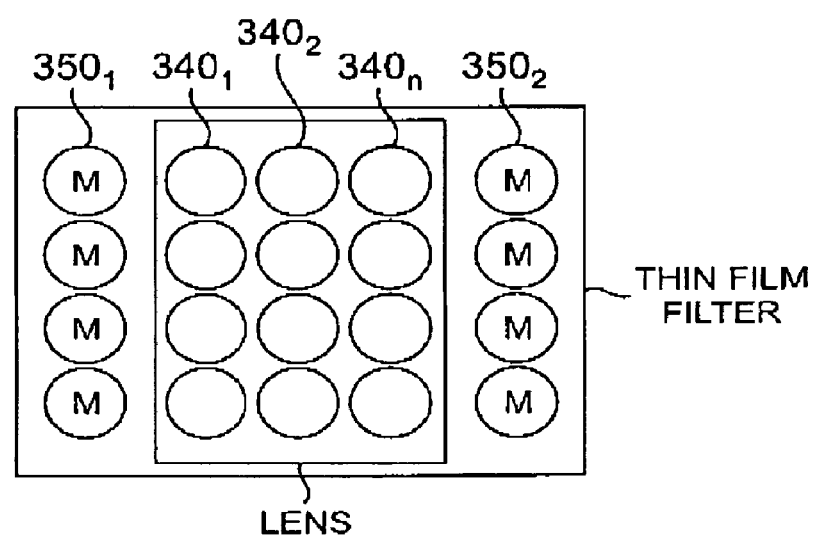
FIG. 5 shows a cross-sectional view through the communication and monitoring ports taken along line A-A in FIG. 3.

For example, FIG. 5 shows a cross-sectional view through the communication and monitoring ports taken along line A-A in FIG. 3. As shown, in this embodiment of the invention the mirrors can undergo two-dimensional tilt and translation by tilting the mirrors both in the plane of the page and into or out of the page. Accordingly, the communication and monitoring ports may include a two-dimensional array of ports such as shown in FIG. 5. Superimposed on FIG. 5 are the perimeters of the various thin film filters 301-304 and the collimating lenses 321-324 as observed by light beams directed from the ports to the free space switches. As previously mentioned, the monitoring ports are arranged so that the optical paths from the monitoring ports are located outside the perimeter of the collimating lenses but within the perimeter of the thin film filters.

A preferred embodiment of the present invention uses broadband fiber taps coupled to the monitoring ports to determine the signals for every wavelength on all ports that are intended to carry WDM signals. In addition, a less expensive broadband monitoring tap with detector could be used on all ports intended to only carry one signal. In such a configuration, the monitoring of all channels provides a means to correlate the actual flow of signals through the switch to cross-check with the intended configuration for performance monitoring and fault correlation at the system level. In addition, the monitors provide a real time measure of the insertion loss that may be useful for some mirror technologies to improve power output accuracy and reduce signal jitter passing through the switch. If real time monitoring of the ingress and egress of all signals is not required, it is anticipated that a reduced overall cost can be achieved with just a single monitoring port in the optical switch, and a switch arrangement to couple different taps into the monitoring port at different times, thereby receiving the same data with fewer monitoring ports.

The inventive dynamic gain equalizer may be used as a stand-alone device that performs optical switching while adjusting in a continuous and calibrated manner the attenuation of each wavelength. The inventive dynamic gain equalizer may also be used to compensate for nonuniformities in the gain of an optical amplifier.

Figure 6:
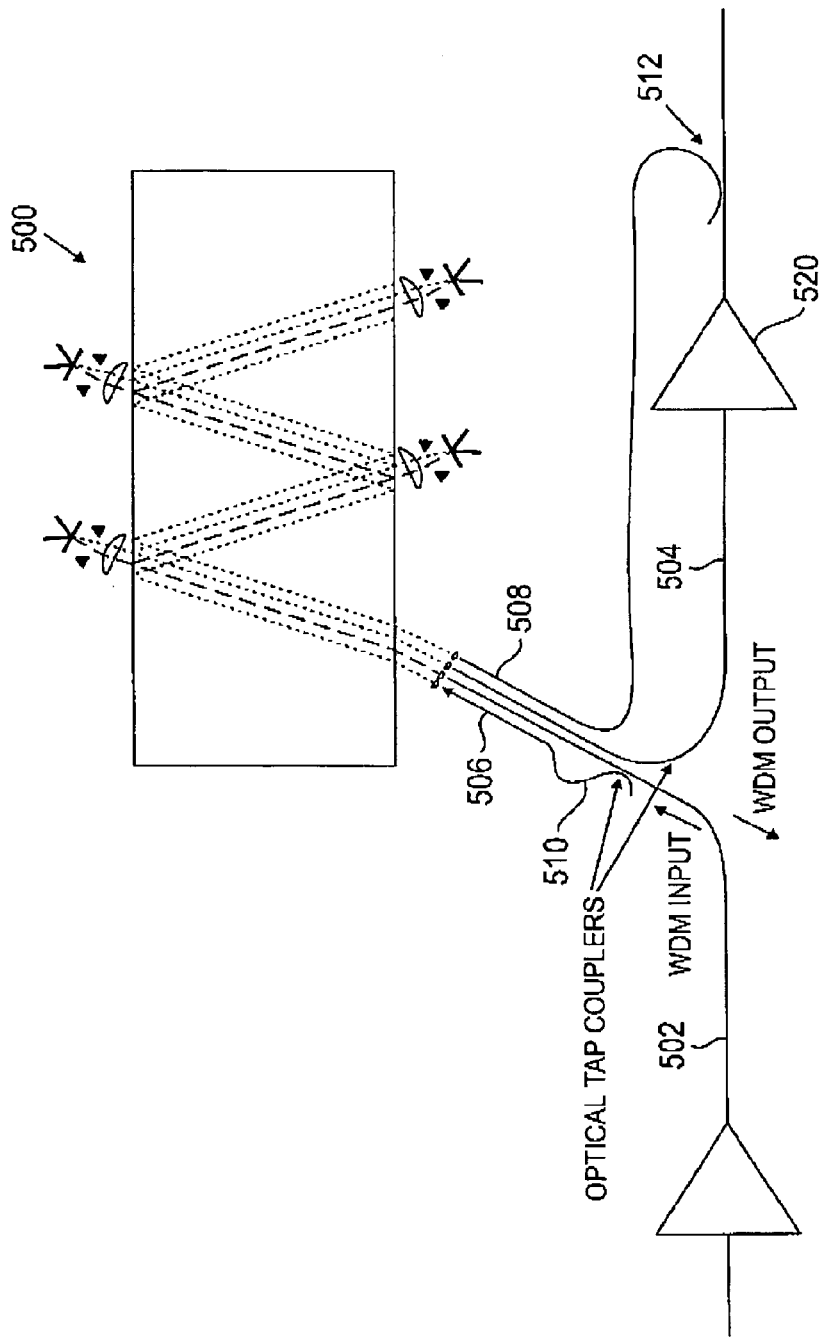
FIG. 6 shows an embodiment of an optical amplifier arrangement constructed in accordance with the present invention, which employs a dynamic gain equalizer.

For example, FIG. 6 shows a dynamic gain equalizer 500 that is used to attenuate the individual wavelengths of an optical signal output from an optical amplifier 520 to provide a substantially flat gain profile. This configuration is similar to that shown in FIG. 4 except that the coupler 512 tapping the signal from the output port to the monitoring port 508 is tapped from the output of optical amplifier 520. In this way the relative signal strength of each wavelength input to the optical amplifier can be compared to its signal strength at the output of the amplifier, thus determining the gain of each wavelength. If the gain of any wavelength exceeds a prescribed threshold, the orientation of the tiltable mirrors in dynamic gain equalizer 500 which are in the optical path of the wavelength can be adjusted to attenuate the wavelength so that the desired gain level is achieved. While the embodiment of the invention depicted in FIG. 6 shows the dynamic gain equalizer preceding the optical amplifier, in other embodiments of the invention the optical amplifier may precede the dynamic gain equalizer.

It is anticipated that the inventive method proposed for analog control over attenuation by beam misalignment is the most cost effective approach to achieve such attenuation, however it should also be recognized that this places additional demands on the mirror pointing accuracy and jitter. Specifically, the attenuation induced is proportional to the overlap integral of the misaligned beam with the output collimator. The misalignment sensitivity of this overlap, and hence the attenuation, is effectively zero at optimum coupling, and increases dramatically as the beams are misaligned. Therefore there may be an unacceptable amount of jitter (amplitude noise) on a given output channel if the mirror pointing is not sufficiently stable at the maximum required attenuation. If the mirror has unacceptable jitter from poor pointing stability, the jitter can be reduced by operating the mirror at the optimum coupling position which is insensitive to jitter, and attenuating the beam with an aperture or shutter (shown in FIG. 3, element 380) that provides analog control over the fraction of the beam that is blocked. While this increases the cost and complexity because of need for the apertures, it does have the benefit of relaxing the stringent requirements placed on the mirrors. Of course it is also possible to use a combination of aperture control and beam misalignment should either of these approaches prove insufficient on their own.

Figure 7:
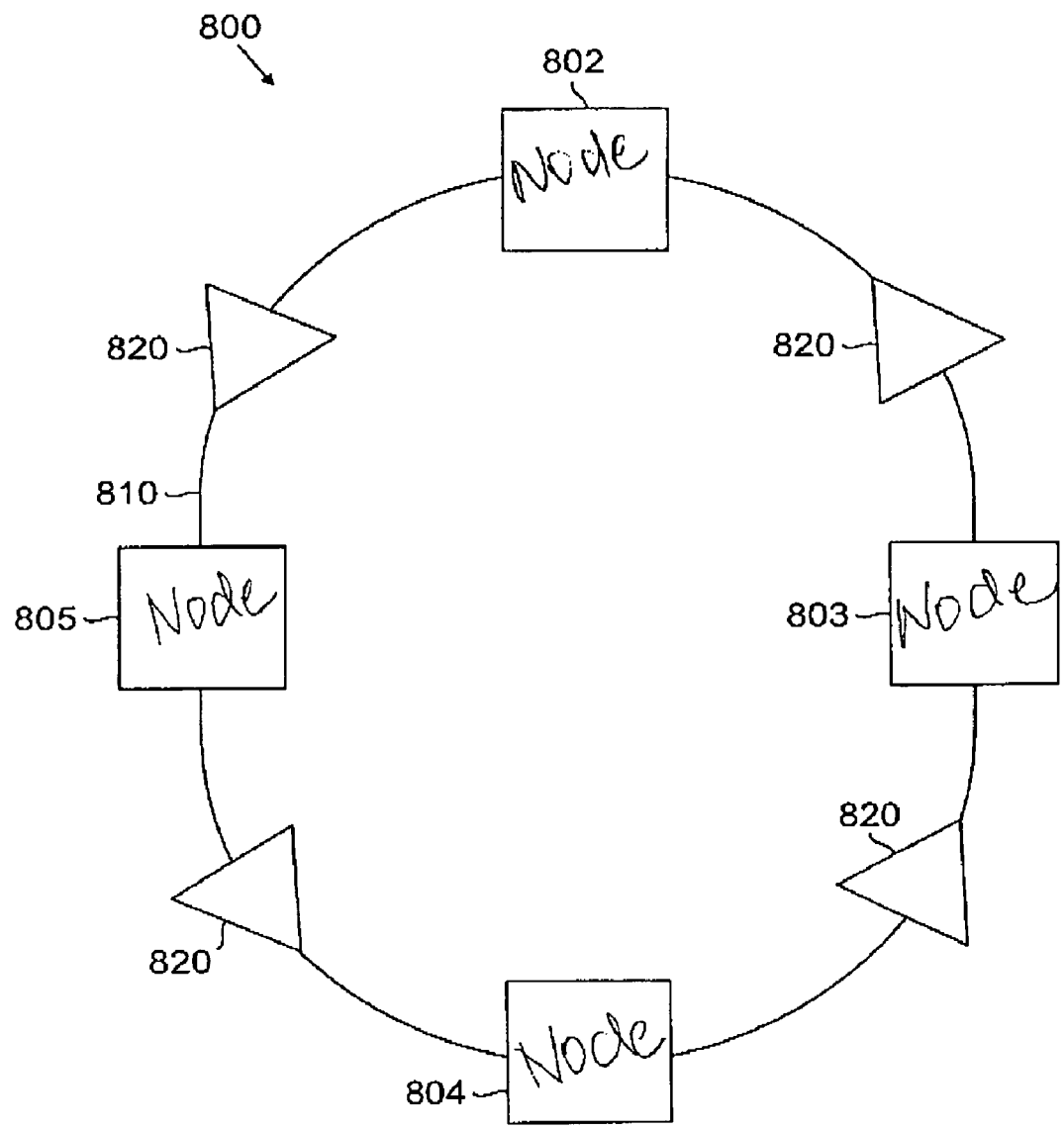
FIG. 7 shows a functional block diagram of an exemplary WDM ring network in which the present invention may be employed.

FIG. 7 shows a functional block diagram of an exemplary WDM ring network 800 in which the present invention may be employed. Ring network 800 includes a plurality of nodes 802-805 connected along a continuous, or looped, optical path 810. Each of these nodes is typically linked by a segment of optical fiber. Optical amplifiers 820 are located at appropriate points along the optical fiber segments. One or more of the optical amplifiers 820 may employ a dynamic gain equalizer in accordance with the present invention. For example, the optical amplifier may be of the type shown in FIG. 6. Nodes 802-805 generally include an optical switch such as an optical crossconnect or an optical add/drop multiplexer (OADM), user interfaces, and a network management element. The optical switches may be static switches in which particular wavelengths received on optical path 810 can only be received by predetermined ones of the local ports of the nodes. Alternatively, one or more of the optical switches may be any of the aforementioned reconfigurable optical switches in which any wavelength channel can be selectively dropped to any local port of the nodes, whether they employ electro-optical elements, or, more preferably, all-optical elements.

Although various embodiments are specifically illustrated and described herein, it will be appreciated that modifications and variations of the present invention are covered by the above teachings and are within the purview of the appended claims without departing from the spirit and intended scope of the invention. For example, while the present invention has been described as a dynamic gain equalizer, the present invention is more generally applicable to a device that adjusts the gain of any one or more wavelength components by a prescribed amount and thus is not necessarily limited to a device that equalizes the gain or power levels of two or more wavelengths components.

The invention claimed is:

1. An optical switch, comprising:
   at least one input port for receiving a plurality of channel wavelengths of an optical signal and a plurality of output ports; and
   a plurality of wavelength selective elements that each select a channel wavelength from among the plurality of channel wavelengths received at the at least one input port;
   a plurality of optical elements respectively associated with said plurality of wavelength selective elements, each of said optical elements directing one of the selected channel wavelengths selected by the associated wavelength selective element to any one of the output ports independently of all other channel wavelengths and with a selectively variable degree of attenuation; and
   a controller for adjusting a configuration of the optical elements to provide the channel wavelengths with the selectively variable degree of attenuation,
   wherein at least one of the optical elements includes a shutter for attenuating the selected channel wavelength directed by the optical element, and wherein said configuration of the optical elements adjusted by the controller includes a position of the shutter within a path traversed by the selected channel wavelength.

2. The optical switch of claim 1 further comprising a monitoring arrangement for determining a power level of a given channel wavelength received in the at least one input port relative to a power level of said given channel wavelength received in one of the output ports.

3. The optical switch of claim 2 wherein said monitoring arrangement comprises:
   at least one monitoring port receiving a portion of optical power at each of the channel wavelengths from the at least one input port;
   at least one detector associated with at least one of said wavelength selective elements for measuring a power level of an optical signal incident thereon, said detector being positioned to receive from the monitoring port the portion of optical power at the channel wavelength selected by the associated wavelength selective element.

4. The optical switch of claim 3 wherein said optical elements each include a collimating lens and a tiltable mirror.

5. The optical switch of claim 4 wherein said detector is positioned so that said received portion of the given channel wavelength does not traverse said collimating lens.

6. The optical switch of claim 4 wherein said configuration of the optical elements adjusted by the controller is a position of the tiltable mirror.

7. The optical switch of claim 3 further comprising a free space region disposed between the input ports and the wavelength selective elements.

8. The optical switch of claim 7 wherein said free space region comprises an optically transparent substrate having first and second parallel surfaces, said wavelength selective element includes a plurality of wavelength selective elements arranged in first and second arrays extending along the first and second parallel surfaces, respectively.

9. The optical switch of claim 8 wherein the optically transparent substrate includes air as a medium in which the optical signal propagates.

10. The optical switch of claim 8 where the optically transparent substrate is silica glass.

11. The optical switch of claim 8 wherein said first and second arrays are laterally offset with respect to one another.

12. The optical switch of claim 11 wherein each of said wavelength selective elements arranged in the first array direct the selected channel wavelength to another of said wavelength selective elements arranged in the second array.

13. The optical switch of claim 3 further comprising a collimating lens disposed between each one of said wavelength selective elements and the optical element associated therewith, each of said optical elements being positioned at a focal point of the lens associated therewith.

14. The optical switch of claim 13 wherein said collimating lens and said optical element serve as a retroreflector.

15. The optical switch of claim 1 further comprising a monitoring arrangement for determining respective power levels of the plurality of channel wavelengths received in the at least one input port relative to respective power levels of the plurality of channel wavelengths received in the output ports.

16. The optical switch of claim 15 further comprising a plurality of input ports and wherein said monitoring arrangement comprises:
   a plurality of monitoring ports each receiving a portion of optical power at each of the channel wavelengths from one of the input ports;
   a plurality of detectors each associated with one of the plurality of wavelength selective elements for measuring a power level of an optical signal incident thereon, said detectors being positioned to respectively receive from the monitoring port the portion of optical power at the channel wavelength selected by the associated wavelength selective element.

17. The optical switch of claim 16 wherein said optical elements each include a collimating lens and a tiltable mirror.

18. The optical switch of claim 17 wherein said detectors are positioned so that the portion of the selected channel wavelengths received from the monitoring ports does not traverse said collimating lens.

19. The optical switch of claim 1 wherein said configuration of the optical elements adjusted by the controller is a position of the optical elements.

20. The optical switch of claim 1 further comprising a free space region disposed between the input ports and the output ports.

21. The optical switch of claim 1 wherein said optical elements retroreflect said channel wavelengths.

22. The optical switch of claim 1 wherein the configuration of the optical elements adjusted by the controller includes a position of the optical elements.

23. An optical switch, comprising:
   at least one input port for receiving a plurality of channel wavelengths of an optical signal and a plurality of output ports;
   a plurality of wavelength selective elements that each select a channel wavelength from among the plurality of channel wavelengths received at the at least one input port;
   a plurality of optical elements respectively associated with said plurality of wavelength selective elements, each of said optical elements directing one of the selected channel wavelengths selected by the associated wavelength selective element to any one of the output ports independently of all other channel wavelengths and with a selectively variable degree of attenuation; and
   a controller for adjusting a configuration of the optical elements to provide the channel wavelengths with the selectively variable degree of attenuation,
   wherein said wavelength selective elements are thin film filters each transmitting therethrough a different one of the channel wavelengths and reflecting the remaining channel wavelengths.

24. An optical switch, comprising:
   at least one input port for receiving a plurality of channel wavelengths of an optical signal and a plurality of output ports;
   a plurality of wavelength selective elements that each select a channel wavelength from among the plurality of channel wavelengths received at the at least one input port;
   a plurality of optical elements respectively associated with said plurality of wavelength selective elements, each of said optical elements directing one of the selected channel wavelengths selected by the associated wavelength selective element to any one of the output ports independently of all other channel wavelengths and with a selectively variable degree of attenuation; and
   a controller for adjusting a configuration of the optical elements to provide the channel wavelengths with the selectively variable degree of attenuation,
   wherein said optical elements are reflective mirrors that are selectively tiltable in a plurality of positions such that in each of the positions the mirrors reflect the channel wavelength incident thereon to any selected one of the output ports.

25. The optical switch of claim 24 wherein the configuration of the optical elements adjusted by the controller includes the position of the reflective mirrors.

26. The optical switch of claim 24 wherein said reflective mirrors are part of a micro-electromechanical (MEM) retroreflective mirror assembly.

27. The optical switch of claim 24 wherein said reflective mirrors are part of a retroreflective optical assembly.

28. The optical switch of claim 24 wherein said reflective mirrors each include a piezoelectric actuator.

29. An optical amplifier system for amplifying with a prescribed gain at least one channel wavelength of a WDM optical signal, said optical amplifier arrangement comprising:
   an optical amplifier having an input port and an output port;
   a dynamic gain adjuster, said dynamic gain adjuster including:
      at least one input port for receiving the WDM optical signal and at least one output port, said output port of the dynamic gain adjuster being optically coupled to the input port of the optical amplifier;
      a plurality of wavelength selective elements that each select a channel wavelength from among the channel wavelengths received at the input port of the dynamic gain adjuster;
      a plurality of optical elements respectively associated with said plurality of wavelength selective elements, each of said optical elements directing one of the selected channel wavelengths selected by the associated wavelength selective element to said output port of the dynamic gain adjuster with a selectively variable degree of attenuation and independently of all other channel wavelengths; and
      a controller for adjusting a configuration of at least one of the optical elements to provide the channel wavelength directed by the optical element with the selectively variable degree of attenuation to achieve the prescribed gain at the output port of the optical amplifier,
      wherein said wavelength selective elements are thin film filters each transmitting therethrough a different one of the channel wavelengths and reflecting the remaining channel wavelengths.

30. The optical amplifier system of claim 29 further comprising a second optical amplifier having an output coupled to the input port of the dynamic gain adjuster.

31. The optical amplifier system of claim 29 wherein the controller adjusts a configuration of each of the plurality of optical elements to provide the channel wavelengths respectively directed by the plurality of optical elements with a selectively variable degree of attenuation to achieve the prescribed gain at the output port of the optical amplifier.

32. The optical amplifier system of claim 29 further comprising a monitoring arrangement for determining a power level of a first channel wavelength in said input port relative to a power level of the first channel wavelength at the output port of the optical amplifier.

33. The optical amplifier system of claim 32 wherein said monitoring arrangement includes at least first and second monitoring ports respectively receiving a portion of a channel wavelength from the input port of the dynamic gain equalizer and from the output port of the optical amplifier.

34. A WDM optical communication system, comprising:
a plurality of network nodes, each of said nodes including an optical switch;
at least one optical communication link interconnecting said nodes;
at least one gain adjustable optical amplifier arrangement located along the communication link, said gain adjustable optical amplifier arrangement including:
an optical amplifier having an input port and an output port;
a dynamic gain adjuster, said dynamic gain adjuster including:
at least one input port for receiving the WDM optical signal and at least one output port, said output port of the dynamic gain adjuster being optically coupled to the input port of the optical amplifier;
a plurality of wavelength selective elements that each select a channel wavelength from among the channel wavelengths received at the input port of the dynamic gain adjuster;
a plurality of optical elements respectively associated with said plurality of wavelength selective elements, each of said optical elements directing one of the selected channel wavelengths selected by the associated wavelength selective element to said output port of the dynamic gain adjuster with a selectively variable degree of attenuation and independently of all other channel wavelengths; and
a controller for adjusting a configuration of at least one of the optical elements to provide the channel wavelength directed by the optical element with the selectively variable degree of attenuation to achieve the prescribed gain at the output port of the optical amplifier,
wherein said wavelength selective elements are thin film filters each transmitting therethrough a different one of the channel wavelengths and reflecting the remaining channel wavelengths.

35. A method for directing at least first and second wavelength components of a WDM signal that includes a plurality of wavelength components from an input port to selected ones of a plurality of output ports, said method comprising the steps of:
(a) demultiplexing the first wavelength component from the WDM signal;
(b) directing the first wavelength component to a given output port while selectively attenuating the first wavelength component;
(c) demultiplexing the second wavelength component from the WDM signal; and
(d) directing the second wavelength component to one of the output ports selected independently from the given output port to which the first wavelength component is directed,
wherein the first wavelength is demultiplexed by a thin film filter having a passband corresponding to the first wavelength.

36. The method of claim 35 further comprising the step of selectively attenuating the second wavelength component while performing step (d).

37. The method of claim 35 further comprising, while performing step (d), the step of selectively attenuating the second wavelength component by a different amount of attenuation than is imparted to the first wavelength component.

38. The method of claim 35 further comprising the steps of monitoring a power level of the first wavelength component before and after selectively attenuating the first wavelength component.

39. The method of claim 35 wherein step (d) is performed subsequent to step (c).

40. The method of claim 35 wherein the first and second wavelength components travel substantially different path lengths between the input port and the output port to which they are respectively directed.

41. The method of claim 35 wherein the steps of directing the first and second wavelength components includes the steps of directing the first and second wavelength components through a free space region.

42. The method of claim 41 wherein the first wavelength component is directed through the free space region by a tiltable mirror.

43. The method of claim 42 wherein the step of directing the first wavelength component to a given output port while selectively attenuating the first wavelength component includes the step of adjusting a position of the tiltable mirror.

44. The method of claim 42 wherein the tiltable mirror is a MEM mirror.

* * * * *